UNITED STATES PATENT OFFICE.

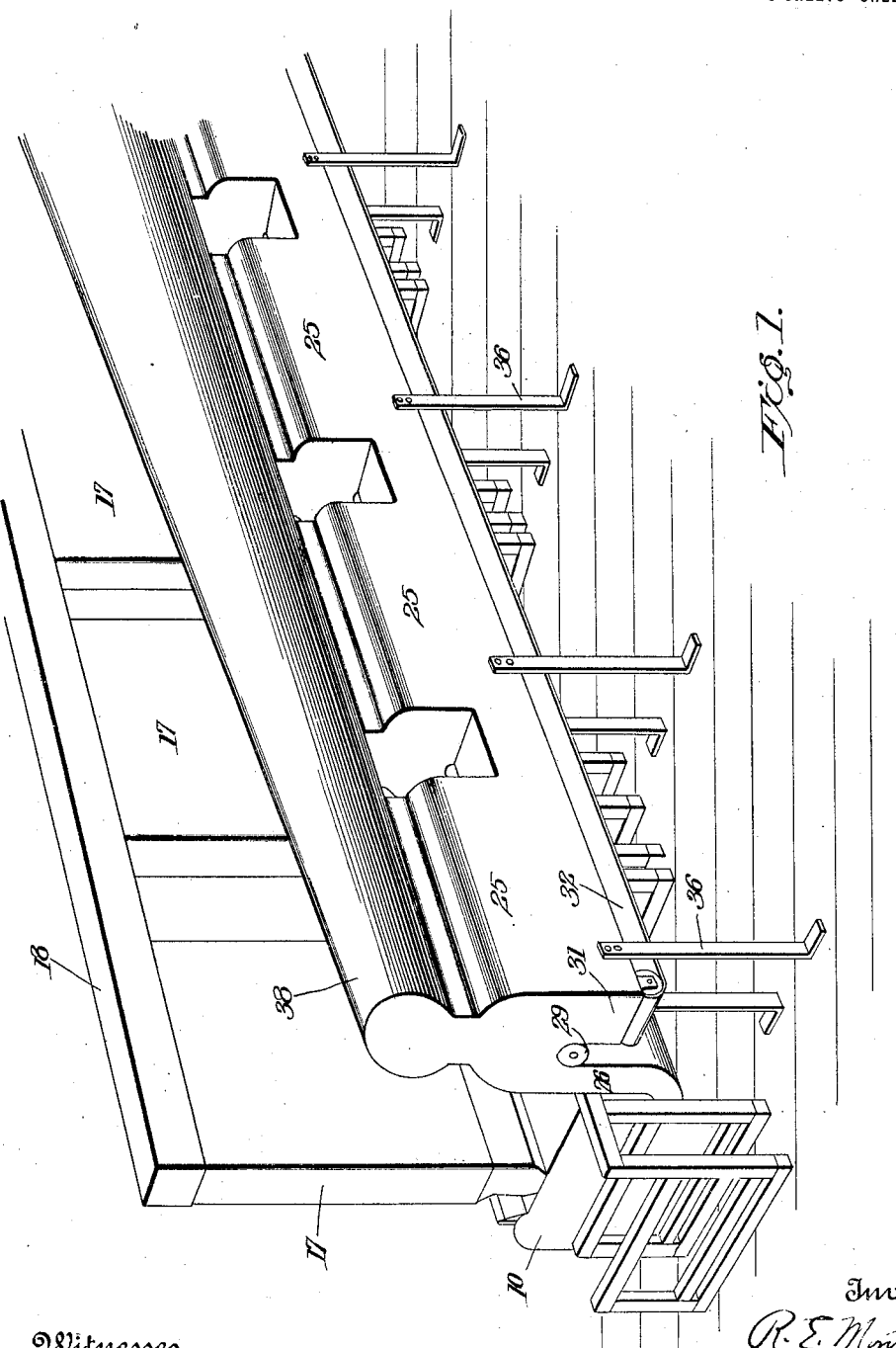

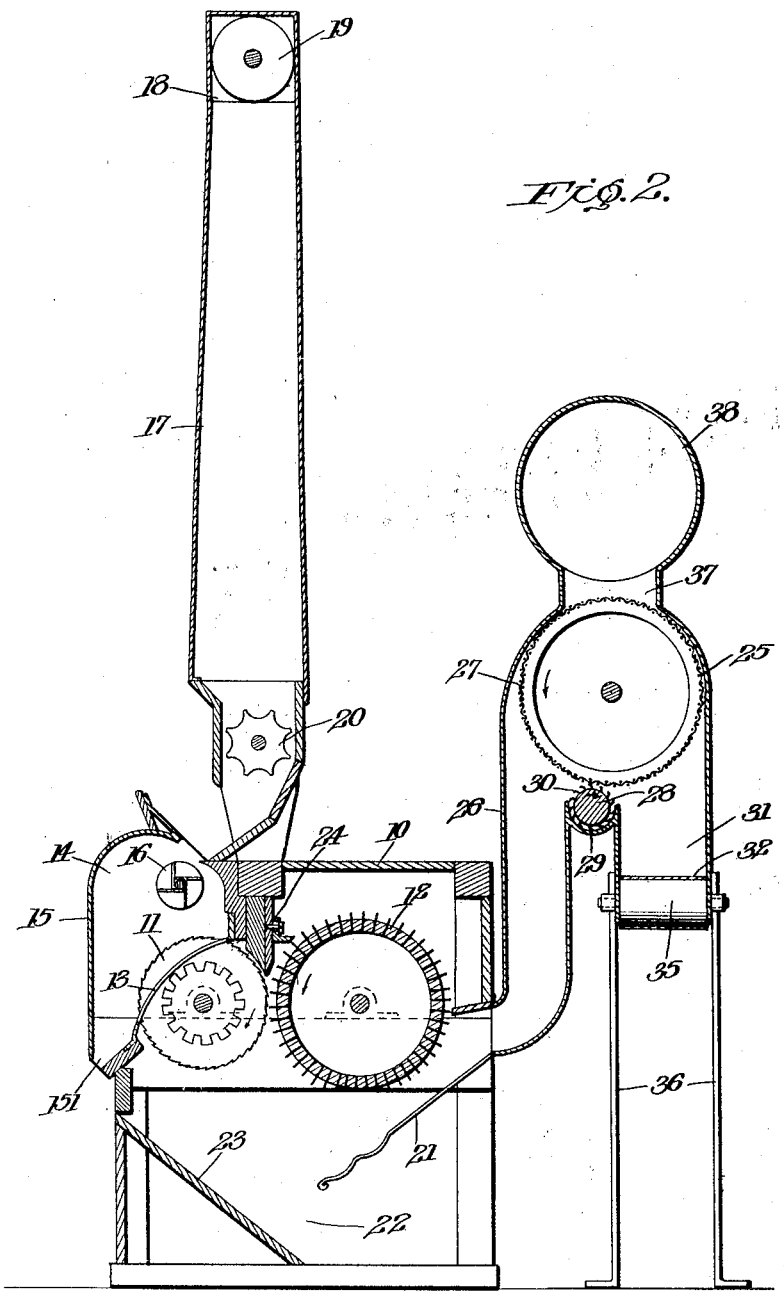

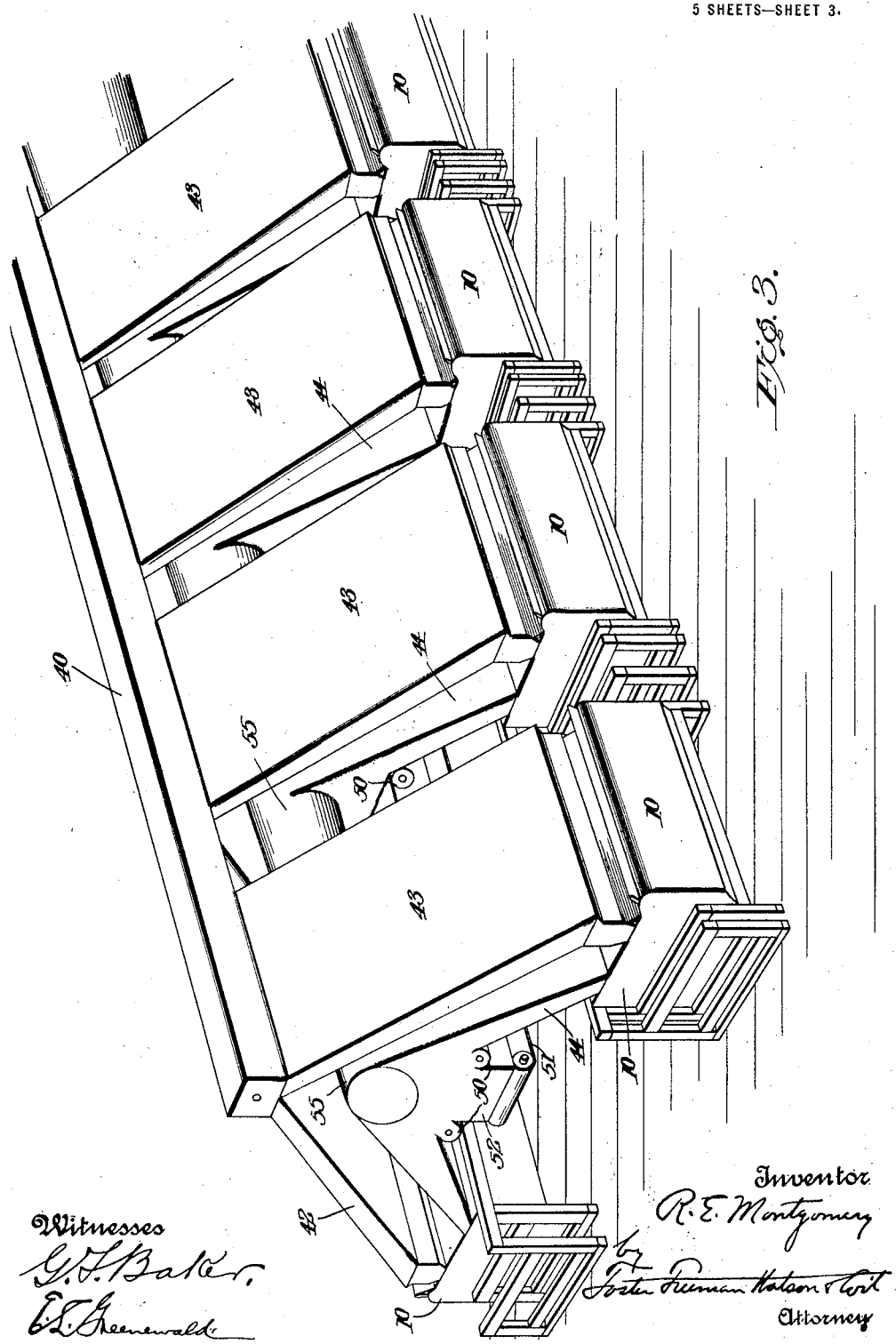

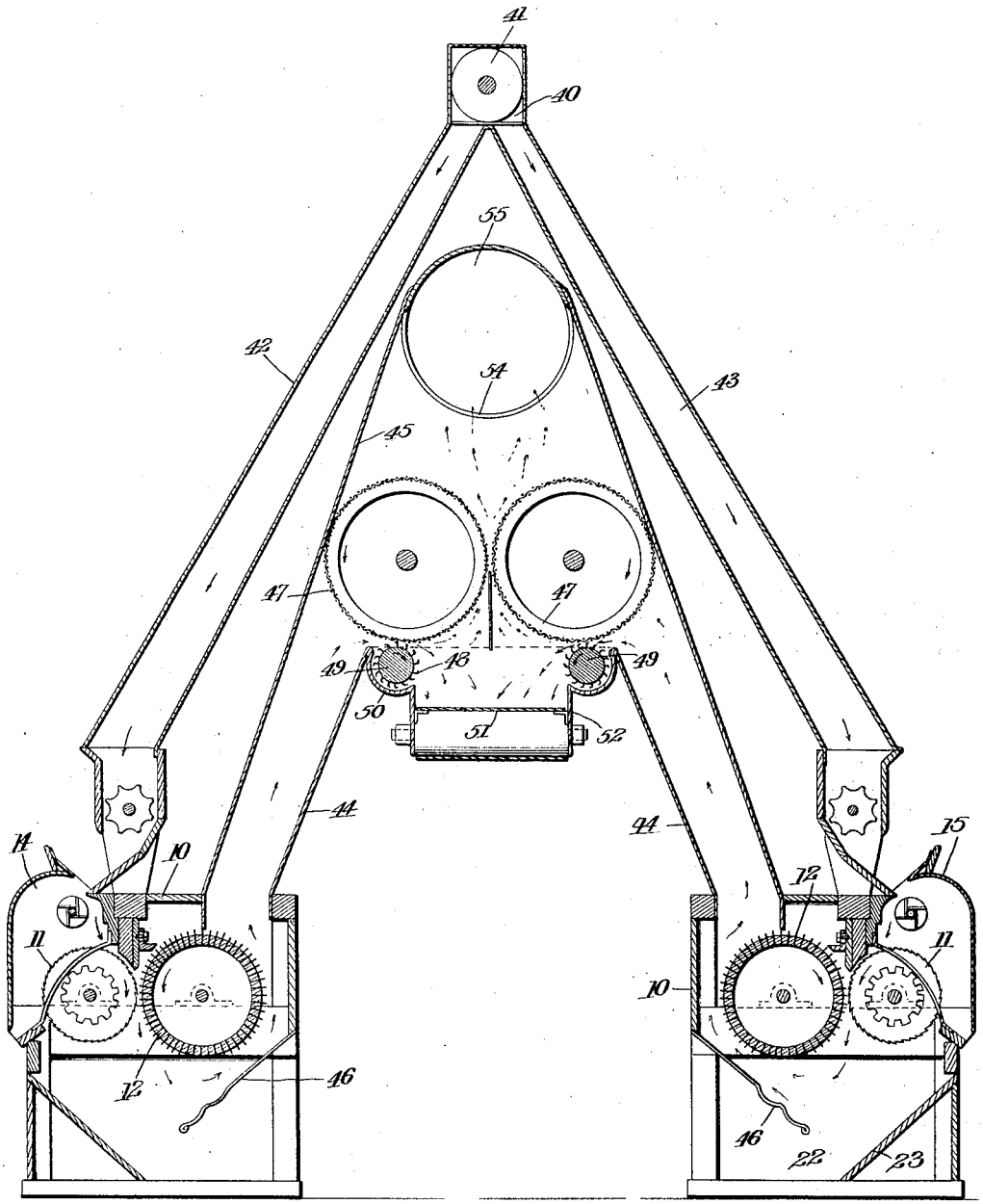

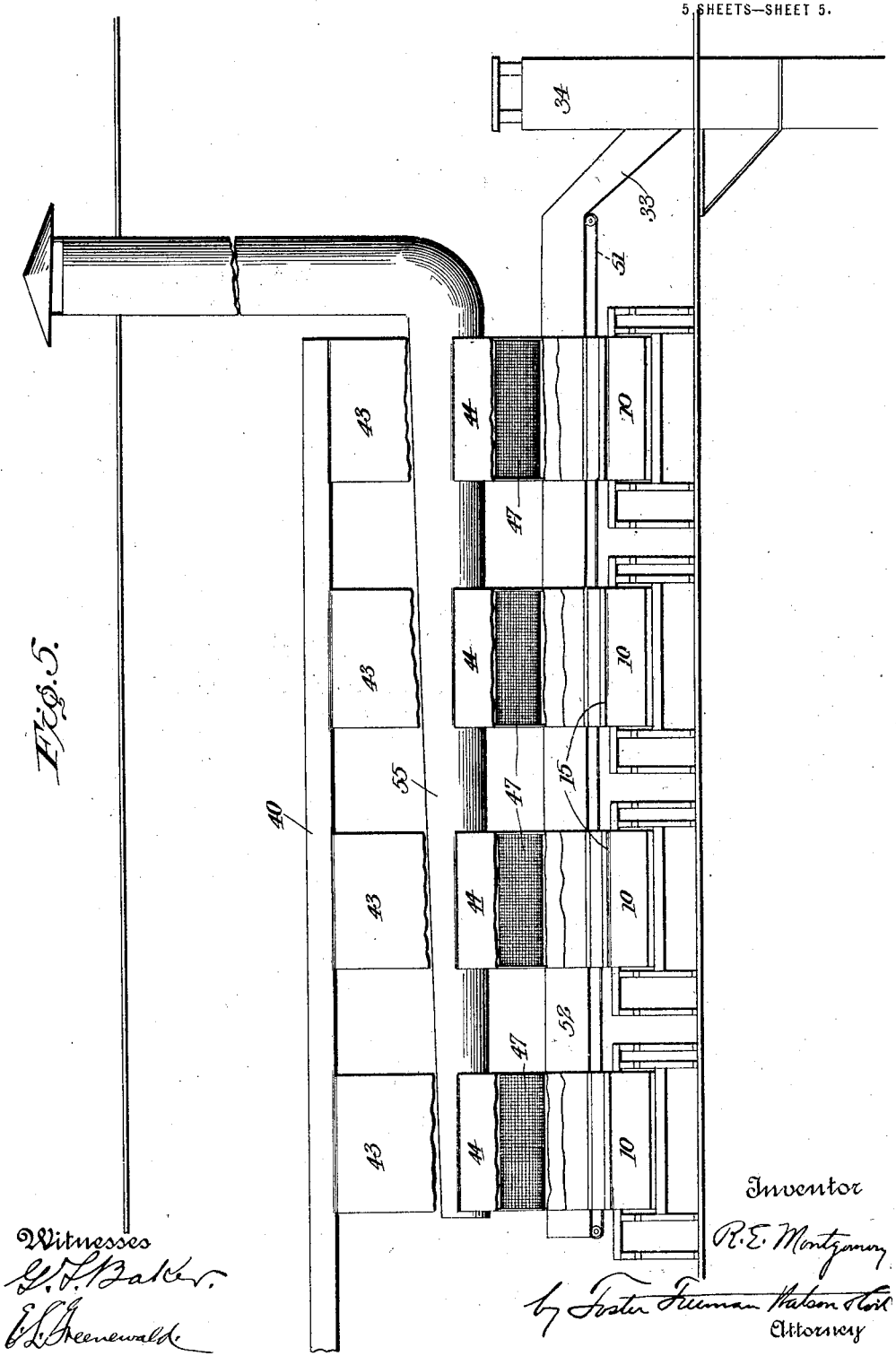

ROBERT E. MONTGOMERY, OF LAWTON, OKLAHOMA.

COTTON-SEED LINTER.

1,327,724.         Specification of Letters Patent.         Patented Jan. 13, 1920.

Application filed February 18, 1916. Serial No. 79,150.

*To all whom it may concern:*

Be it known that I, ROBERT E. MONTGOMERY, a citizen of the United States, and resident of Lawton, Comanche county, State of Oklahoma, have invented certain new and useful Improvements in Cotton-Seed Linters, of which the following is a specification.

My invention relates to apparatus for delinting cotton seed and has particular reference to a lint collecting and dust collecting arrangement for linters such as are commonly used in cotton seed oil mills.

The principal objects of my invention are to decrease the labor and expense of removing from the cotton seed what are commonly known as linters, and handling the lint thus obtained.

A further object is to eliminate the dust in the lint room in order to provide a more comfortable and healthy place for the employees to work in and also to save labor in sweeping up, collecting and removing the dust produced in the lint room.

The above and other objects and the novel features of my invention will be apparent from the following description taken in connection with the drawings in which, Figure 1 is a view illustrating a battery of linters equipped with a dust and lint collecting apparatus embodying my invention;

Fig. 2 is a transverse sectional view of a linter, showing the connection of the feeding device and the connection and arrangement of the dust collecting and lint collecting means;

Fig. 3 is a perspective view illustrating a double battery of linters equipped with dust collecting and lint collecting mechanism embodying my invention;

Fig. 4 is a transverse sectional view taken on a line through two oppositely disposed linters of Fig. 3, and illustrating in section the arrangement of the lint collecting and dust removing means;

Fig. 5 is a side view of a battery of linters equipped with the means embodying my invention, parts being shown broken out.

The invention relates to a dust removing and lint collecting system intended to be used in connection with cotton seed linting machines such as are shown and described in Patents Nos. 962,722 and 1,077,435, granted to H. E. Sessions, June 28, 1910 and November 4, 1914, respectively. These machines are used in cotton seed oil mills for taking off of the cotton seed what are commonly known as linters, or what might be called a second cut of lint with a staple measuring from practically nothing to one quarter of an inch in length.

The particular linter shown in the drawings is similar in all essential details to the linter shown and described in the patent to Sessions, 1,077,435, mentioned above. The linter comprises a casing 10 which forms a substantially closed chamber for a saw cylinder 11, and a brush cylinder 12, which are rotatably mounted therein and respectively revolve in the directions of the arrows thereon. The saw cylinder consists of a gang of saws which pass between the saw ribs 13 and into the seed chamber 14, closed at the front by a breast plate 15. A float 16 rotatably mounted in the seed chamber 14 agitates the seed and assists in properly feeding them to the saws 11. A chute 17 leads from the seed chamber 14 upwardly above the linter to a conveyer trough 18 in which a rotary spiral conveyer 19 is located. The conveyer trough 18 and conveyer 19 therein extend longitudinally of a battery of linters and communicate with the individual seed chutes 17 of each of the linters. The feed from the chute 17 is regulated by suitable feed mechanism 20 at the lower end thereof. The delinted seed passes out of the chamber 14 through the opening 151.

The saws 11 engage the seed and remove therefrom the small particles of lint and the brushes on the brush cylinder engage the teeth of the saws and, rotating at a higher rate of speed than the saw cylinder, brush the cotton from the teeth of the saws down toward the floor or platform on which the casing 10 is mounted. The rotation of the brush 12 causes a draft which assists in removing the lint from the saw teeth. As described in the Sessions patent a corrugated mote board 21 is provided which is positioned at an angle of about 45° to the floor of the casing whereby a large space is left below the brush and saw cylinders. An inlet 22 for air is provided beneath the lower edge of the mote board 21 and an inclined wall 23 is located opposite the inlet 22 to assist in the proper circulation of the air in the casing. The casing is closed at the ends to prevent side drafts. I also provide a suitable vertically movable board 24 for regulating the admission of air between the brush and saw cylinders.

At the rear of each casing there is a housing 25, the front side of which is connected by an air and lint flue 26 with the casing 10 on the side next to the brush cylinder 12 and at the upper end of the mote board 21. The mote board 21, being widely separated from the brush 12, provides a flue between it and the brush through which the lint will be carried upwardly into the flue 26 by the draft created by the rotation of the brush 12. The motes, trash and other heavy foreign substances, being heavier than the lint, will be separated from the lint in the space below the saw and brush cylinders and the gentle draft created will draw the lint upwardly through the flue 26 where it will be collected on the wire screen of the condenser 27. The condenser 27 is in the form of a cylinder and one is rotatably mounted in the casing 25 of each linter. The lint which collects on the exterior surface of the condenser 27 is removed by means of a doffing roller 28 which is rotatably mounted in a recess 29 located in the housing 25 below the condenser 27. The doffing roller 28 has flexible ribs 30 which engage the under side of the condenser, removing the lint and discharging it into the lint box 31 at the lower end of the housing 25. The lint boxes of the housings of the separate linters are connected as shown in Fig. 1 so as to permit an endless conveyer belt 32 to travel the entire length of the battery of linters. The top run of the endless conveyer belt 32 passes through the lint box 31 and discharges the lint through the chute 33 into the press 34 (see Fig. 5). The lower run of the conveyer belt 32 extends beneath the bottom of the lint box, the belt running over rollers 35 at the ends of its travel. The connected housings are supported from the floor by the legs 36 placed at intervals along the housings.

At the top each housing 25 has an outlet 37 which opens into a dust and air flue 38 extending longitudinally of the battery of linters. The lint carried by the air passing through the flue 26 is deposited on the surface of the condenser cylinder 27 but the air and dust are carried on through the outlet 37 into the flue 38. The air flue 38 extends out through the roof of the building in which the linters are located, thereby preventing the accumulation of dust in the linting room. The air flue 38 tapers and becomes of larger size as the volume of air to be handled increases.

Referring to Figs. 3 and 4, I have shown two batteries of linters arranged back to back with a common lint collecting and air and dust removing means between them. The linters shown in these views are in most respects similar to those described in the Sessions Patent No. 1,077,435. In this form of construction, the seed feed chute 40 with the spiral conveyer 41 is located centrally above and between the battery of linters and delivers to the feed chutes 42 and 43 for the linters on opposite sides thereof. While I have shown the preferred arrangement of lint and air flue 26 in Fig. 2, the lint and air flues 44 in Figs. 3 and 4 may lead from the upper side of the linter casing 10 to the housing 45. The mote boards 46 are disposed in the same relation to the brush cylinder 12 as in the form shown in Figs. 1 and 2, but the lint removed by the brush is carried upwardly around the brush and through the top of the casing instead of through the side of the casing as in the form shown in Fig. 2. The upper ends of the flues 44 open into the casing 45 which is common to the two oppositely disposed linters and discharge the lint onto the condensers 47 at the upper ends of the flues. The lint carried upwardly by the air collects on the screen on the outer surface of the condensers and is carried by the rotation of the condensers into contact with the flexible ribs 48 on the doffing rollers 49 located below the condensers and in recesses 50 of the casing 45. The rotating doffing devices 49 remove the lint from the condensers and discharge it onto an endless conveyer belt 51 in the lint box 52, which extends longitudinally above and between the batteries of linters and is common to both batteries of linters. The lint box 52 extends the entire length of the batteries of linters and is provided at its end with a chute similar to the chute 33 which delivers to a press where the lint is compressed into bales. The lower run of the conveyer passes beneath the lint box and the upper run passes through the conveyer box 52, delivering the lint to the chute 33. The dust and air passing through the condensers is conducted through an outlet 53 in the casing 45 to the air and dust flue 55. The air and dust flue 55 is common to the two batteries of linters and is similar to the flue 38 of Figs. 1 and 2, and discharges the air and dust outside of the room in which the linters are located.

The arrangement shown provides a system in which the lint is separated from the seeds and delivered to the cotton press without the necessity of handling the lint, which will insure a more uniform lint as the lint will not be liable to be dropped on the dirty floor or become soiled in handling. My invention, furthermore, provides a dust removing arrangement by means of which the air and dust are separated from the lint and confined until they pass out of the building, thereby making it more comfortable and healthful for the employees in the room, as well as saving labor in sweeping up and removing the dust. This accomplishes a decrease in the amount of labor and also a decrease in the insurance rates for the building.

I am aware that in the operation of cotton gins dust flues have been used to remove dust from a battery of gins, but the removal of the lint or second cut from the seed presents problems in the control of air currents which are not encountered in the ordinary cotton gin. By my invention I overcome the difficulties and am able to more economically and satisfactorily separate the lint from the seeds.

Having thus described the invention, what is claimed and desired to be secured by Letters Patent is:

1. In a cotton seed linting mechanism, the combination with means for removing the fine particles of lint from previously ginned seed, of means for causing an air current to separate the fine lint from the motes and trash and to carry said lint in suspension, a rotary condenser through which said current passes adapted to collect on its surface said fine particles but to permit the air and dust to pass through, means for removing said dust laden air, a doffing roller adapted to brush from said rotary condenser the lint collected thereon, and a belt conveyer in position to receive the lint brushed off by said doffing roller.

2. In a cotton seed linting mechanism, the combination with a series of machines for removing the fine particles of lint from previously ginned seed, of means in each of said machines for causing an air current to separate the fine lint from the motes and trash and to carry said lint in suspension, a rotary condenser for each machine, through which said current passes adapted to collect on its surface said fine particles but to permit the air and dust to pass through, means for removing said dust laden air including a common pipe for all of said condensers, a doffing roller for each condenser adapted to brush from said rotary condenser the lint collected thereon, and a belt conveyer in position to receive the lint brushed off by all of said doffing rollers.

3. In a cotton seed linting mechanism, the combination with a series of machines arranged in pairs for removing the fine particles of lint from previously ginned seed, of means in each of said machines for causing an air current to separate the fine lint from the motes and trash and to carry said lint in suspension, a rotary condenser for each machine through which said current passes adapted to collect on its surface said fine particles but to permit the air and dust to pass through the condensers for each pair of machines being arranged in pairs parallel, means for removing said dust laden air, including a common pipe for all of said condensers, a doffing roller for each condenser adapted to brush from said rotary condenser the lint collected thereon, the doffing rollers of each pair of condensers arranged on the under side of said condensers and brushing the lint toward each other, and a belt conveyer in position to receive the lint brushed off by all of said doffing rollers.

In testimony whereof I affix my signature.

ROBERT E. MONTGOMERY.